US00RE48098E

(19) United States
(12) Reissued Patent
Chiba et al.

(10) Patent Number: US RE48,098 E
(45) Date of Reissued Patent: Jul. 14, 2020

(54) THERMOPLASTIC RESIN FOAMED PARTICLES

(71) Applicant: JSP CORPORATION, Tokyo (JP)

(72) Inventors: Takuya Chiba, Mie (JP); Masaharu Oikawa, Mie (JP)

(73) Assignee: JSP CORPORATION, Tokyo (JP)

(21) Appl. No.: 16/263,547

(22) Filed: Jan. 31, 2019

Related U.S. Patent Documents

Reissue of:
(64) Patent No.: 10,106,664
Issued: Oct. 23, 2018
Appl. No.: 15/580,308
PCT Filed: Jun. 3, 2016
PCT No.: PCT/JP2016/066592
§ 371 (c)(1),
(2) Date: Dec. 7, 2017
PCT Pub. No.: WO2016/199693
PCT Pub. Date: Dec. 15, 2016

(30) Foreign Application Priority Data

Jun. 10, 2015 (JP) ..... 2015-117688

(51) Int. Cl.
*C08J 9/16* (2006.01)
*B29B 9/06* (2006.01)
(Continued)

(52) U.S. Cl.
CPC ..... *C08J 9/16* (2013.01); *B29B 9/06* (2013.01); *B29C 44/02* (2013.01);
(Continued)

(58) Field of Classification Search
CPC ..... C08J 9/16; C08J 9/008; C08J 9/122; C08J 9/18; C08J 9/232; C08J 9/0061;
(Continued)

(56) References Cited

U.S. PATENT DOCUMENTS 7,671,820 B2 * 3/2010 Tokoro ..... C04B 38/06 343/753
2008/0108717 A1 5/2008 Tokoro et al.
(Continued)

FOREIGN PATENT DOCUMENTS

JP 58-145739 * 8/1983
JP 61-12735 1/1986
(Continued)

OTHER PUBLICATIONS

Translation of Table 1 in JP 61-12735 A by USPTO translator (Year: 1986).*

(Continued)

*Primary Examiner* — Alan D Diamond
(74) *Attorney, Agent, or Firm* — Wenderoth, Lind & Ponack, L.L.P.

(57) ABSTRACT

Thermoplastic resin foamed particles of the present invention including [more than] one *or more* functional additive selected from inorganic powder and inorganic fibers each includes a core layer formed of a thermoplastic resin and a coating layer in a foamed state formed of a thermoplastic resin, the mass ratio of the coating layer to the core layer is 99:1 to 50:50, the content (X) of the functional additive in the core layer is 5 to 90% by mass, and the content of the functional additive in the coating layer is smaller than the content (X) of the functional additive in the core layer. By this way, thermoplastic resin foamed particles from which a homogeneous foamed particle molding having excellent dimension stability, fusibility and appearance can be obtained while containing functional additive are provided.

6 Claims, 3 Drawing Sheets

(51) Int. Cl.

| | |
|---|---|
| ***B29C 44/02*** | (2006.01) |
| ***B29C 44/34*** | (2006.01) |
| ***C08J 9/00*** | (2006.01) |
| ***C08J 9/12*** | (2006.01) |
| ***C08J 9/228*** | (2006.01) |
| ***C08J 9/232*** | (2006.01) |
| ***B32B 5/18*** | (2006.01) |
| ***B32B 27/18*** | (2006.01) |
| ***C08J 9/18*** | (2006.01) |
| ***C08J 9/22*** | (2006.01) |
| ***B29K 105/12*** | (2006.01) |
| ***B29K 509/00*** | (2006.01) |

(52) U.S. Cl.
CPC ..... *B29C 44/3415* (2013.01); *B29C 44/3461* (2013.01); *B32B 5/18* (2013.01); *B32B 27/18* (2013.01); *C08J 9/008* (2013.01); *C08J 9/0061* (2013.01); *C08J 9/122* (2013.01); *C08J 9/18* (2013.01); *C08J 9/22* (2013.01); *C08J 9/228* (2013.01); *C08J 9/232* (2013.01); *B29K 2105/12* (2013.01); *B29K 2509/00* (2013.01); *B29K 2995/0011* (2013.01); *C08J 2201/034* (2013.01); *C08J 2203/06* (2013.01); *C08J 2205/044* (2013.01); *C08J 2205/052* (2013.01); *C08J 2207/00* (2013.01); *C08J 2323/12* (2013.01); *C08J 2323/14* (2013.01); *C08J 2423/14* (2013.01)

(58) Field of Classification Search
CPC ..... C08J 9/22; C08J 9/228; C08J 2205/044; C08J 2323/14; C08J 2205/052; C08J 2201/034; C08J 2207/00; C08J 2423/14; C08J 2323/12; C08J 2203/06; C08J 9/224; C08J 9/0066; B29C 44/3461; B29C 44/3415; B29C 44/02; B29B 9/06; B32B 27/18; B32B 5/18; B29K 2509/00; B29K 2995/0011; B29K 2105/12; C09D 7/61; C08K 3/044; C08K 3/042; C08K 3/041; C08K 3/046; C08K 3/043; C08K 2201/001; C08K 3/04
See application file for complete search history.

(56) References Cited

U.S. PATENT DOCUMENTS

| | | | | |
|---|---|---|---|---|
| 2014/0097389 | A1* | 4/2014 | Chiba | H01B 1/24 252/511 |
| 2015/0102269 | A1* | 4/2015 | Chiba | C08J 9/224 252/511 |
| 2015/0158990 | A1* | 6/2015 | Takagi | B29C 44/3461 428/407 |

FOREIGN PATENT DOCUMENTS

| | | | |
|---|---|---|---|
| JP | 4-056298 | | 2/1992 |
| JP | 2002-003634 | * | 1/2002 |
| JP | 2002-3634 | | 1/2002 |
| JP | 2004-115785 | | 4/2004 |
| JP | 2014-115785 | * | 4/2004 |
| JP | 2006-232939 | * | 9/2006 |

OTHER PUBLICATIONS

Extended European Search Report dated Oct. 15, 2018 in corresponding European Patent Application No. 16807400.3.
International Search Report dated Jul. 19, 2016 in International Application No. PCT/JP2016/066592.

* cited by examiner

[Fig. 1]
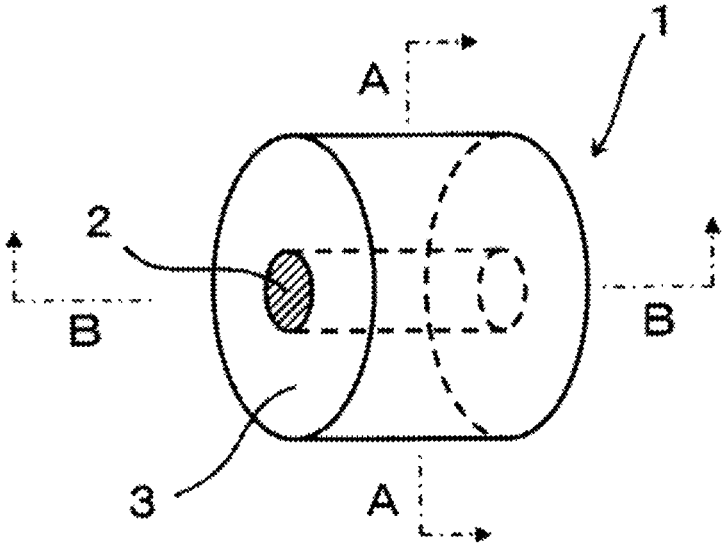

[Fig. 2]
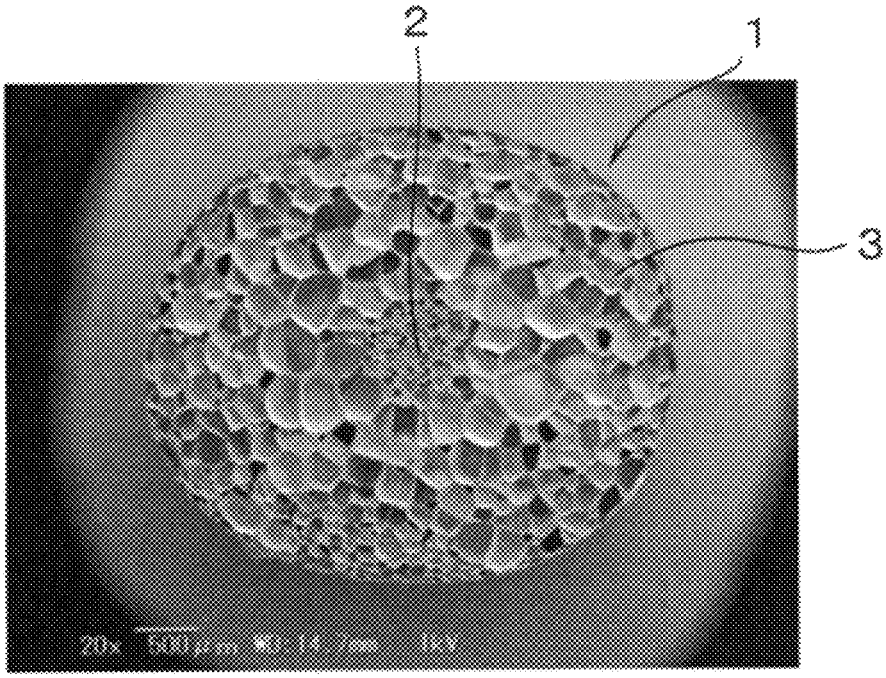

[Fig. 3]
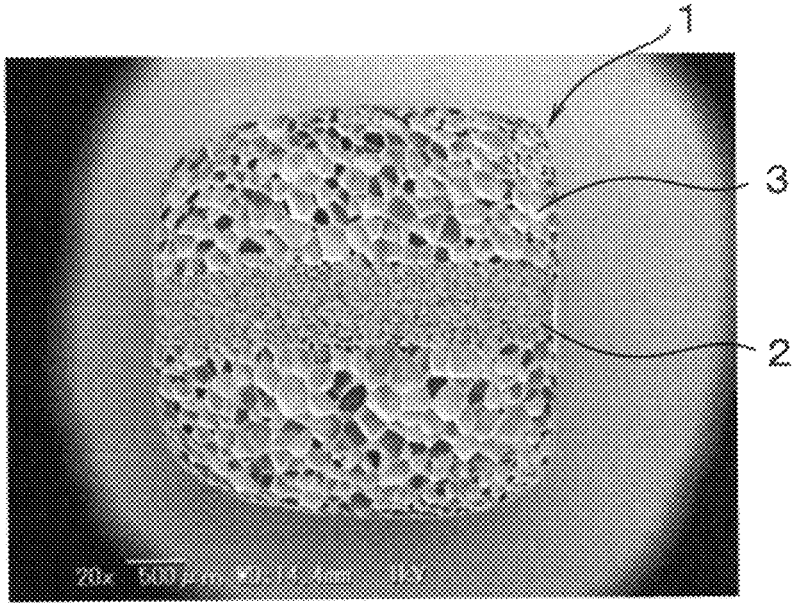

THERMOPLASTIC RESIN FOAMED PARTICLES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention relates to thermoplastic resin foamed particles containing functional additive.

BACKGROUND ART

Thermoplastic resin foamed particles can be molded into various shapes according to use by in-mold molding. Thermoplastic resin foamed particle molding obtained from said foamed particles by in-mold molding are used in a wide variety of use such as dielectric bodies, electric wave shielding bodies, heat insulating materials, packaging materials for electronic parts, shock absorbing materials and reusable containers.

For example, Patent Literatures 1 and 2 describe that foamed particle molding containing functional additive such as inorganic powder and inorganic fibers are used as dielectric bodies and electric wave absorbers.

CITATION LIST

Patent Literature

Patent Literature 1: JP 2008-512502 W
Patent Literature 2: JP H04-56298 A

SUMMARY OF INVENTION

Technical Problem

However, as described in Patent Literature 1, in a case where the thermoplastic resin foamed particles contained functional additive in a large amount, it was possible that the secondary foamability of the foamed particles decreases and thus the fusibility and appearance of a foamed particle molding may decrease. Therefore, in such case, problems remained in productivity so as to obtain a fine molding, for example, it was necessary to increase the molding pressure during the in-mold molding, and it was necessary to pressurize the foamed particles in advance, and the like. Furthermore, in the electric wave absorber described in Patent Literature 2, a foamed particle molding is formed by using foamed particles to which a dielectric body is adhered and foamed particles to which a dielectric body is not adhered. However, in this method, it is difficult to completely and homogeneously mix these two kinds of foamed particles during the molding of the foamed particle molding, and thus problems remained in productivity since there was a possibility that unevenness occurs in the properties among the foamed particle molding, and the production control was difficult.

The present invention was made in view of the above-mentioned conventional problems, and aims at providing thermoplastic resin foamed particles from which a homogeneous foamed particle molding having excellent dimension stability, fusibility and appearance can be obtained while containing functional additive.

Solution to Problem

The present invention provides the thermoplastic resin foamed particles described below.

<1> Thermoplastic resin foamed particles comprising [more than] one *or more* functional additive selected from inorganic powder and inorganic fibers, wherein each particle includes a core layer formed of a thermoplastic resin and a coating layer in a foamed state formed of a thermoplastic resin, the mass ratio of the coating layer to the core layer is 99:1 to 50:50, the content (X) of the functional additive in the core layer is 5 to 90% by mass, and the content of the functional additive in the coating layer is smaller than the content (X) of the functional additive in the core layer.

<2> The thermoplastic resin foamed particles according to <1>, wherein the content of the functional additive in the coating layer is lower than 20% by mass (including 0).

<3> The thermoplastic resin foamed particles according to <1> or <2>, wherein the functional additive is [an] *a* conductive carbon.

<4> The thermoplastic resin foamed particles according to any one of <1> to <3>, wherein the thermoplastic resin that forms the core layer and the thermoplastic resin that forms the coating layer are both polyolefin-based resins.

Advantageous Effects of Invention

According to the thermoplastic resin foamed particles of the present invention, since the core layer of each foamed particle including the core layer and a coating layer in a foamed state is highly filled with the functional additive, the distribution of the functional additive in the molding is homogenized, and a foamed particle molding in which the function(s) of the functional additive is effectively exerted can be obtained. Furthermore, since the content of the functional additive in the coating layer is smaller than the content of the functional additive in the core layer, a homogeneous foamed particle molding that can be sufficiently secondary-foamed, and have excellent appearance, in which the fusibility of the foamed particles forming the foamed particle molding has been improved, can be provided.

BRIEF DESCRIPTION OF DRAWINGS

FIG. 1 is a schematic perspective view schematically showing an embodiment of the thermoplastic resin foamed particle according to the present invention.

FIG. 2 is an actual electron microscopic photograph of a cross-sectional surface at A-A of the thermoplastic resin foamed particle in FIG. 1.

FIG. 3 is an actual electron microscopic photograph of a cross-sectional surface at B-B of the thermoplastic resin foamed particle in FIG. 1.

DESCRIPTION OF EMBODIMENTS

The thermoplastic resin foamed particles of the present invention will further be explained below in detail with referring to the embodiments for carrying out the invention. FIG. 1 shows a schematic perspective view schematically showing an embodiment of the thermoplastic resin foamed particle of the present invention, FIG. 2 shows an actual electron microscopic photograph of a cross-sectional surface at A-A of the thermoplastic resin foamed particle, and FIG. 3 shows an actual electron microscopic photograph of a cross-sectional surface at B-B of the thermoplastic resin foamed particle.

[Thermoplastic Resin Foamed Particles 1]

As shown in FIG. 1, the thermoplastic resin foamed particle 1 of the present embodiment includes a core layer 2 formed of a thermoplastic resin and a coating layer 3 in a foamed state formed of a thermoplastic resin.

(Core Layer 2)

The core layer 2 is formed of a thermoplastic resin, and contains [more than] one *or more* functional additive selected from inorganic powder and inorganic fibers as essential component. The structure of the core layer 2 may be in either a foamed state or a non-foamed state.

(Thermoplastic Resin)

Examples of the thermoplastic resin that forms the core layer 2 include polyolefin-based resins such as polyethylene-based resins and polypropylene-based resins, polystyrene-based resins, polycarbonate resins, polyvinylchloride resins, polymethacrylic-based resins, acrylonitrile-based resins, polyester-based resins, polyamide-based resins and thermoplastic polyurethane resins, and blend polymers thereof, and the like.

Among these, the polyolefin-based resins are preferably used. Furthermore, in a case where a mixed resin of a polyolefin-based resin and other resin is used, the mixed resin contains the polyolefin-based resin by preferably 50% by mass or more, more preferably 70% by mass or more, and further preferably 90% by mass or more.

Examples of the above-mentioned polyethylene-based resin include low density polyethylenes, high density polyethylenes, linear low density polyethylenes, ultra-low density polyethylenes, ethylene-vinyl acetate copolymer, ethylene-methyl methacrylate copolymer, ethylene-methacrylic acid copolymer and ionomer-based resins obtained by cross-linking the molecules thereof with metal ions.

Furthermore, examples of the above-mentioned polypropylene-based resins include propylene homopolymers, and propylene-based copolymers containing structural units derived from propylene by 50% by mass or more. As the copolymers, copolymers of propylene and ethylene or an $\alpha$-olefin having 4 or more carbon atoms such as an ethylene-propylene copolymer, a propylene-butene copolymer and a propylene-ethylene-butene copolymer, a propylene-acrylic acid copolymer and a propylene-maleic anhydride copolymer can be exemplified. These copolymers may be either block copolymers, random copolymers or graft copolymers.

As the thermoplastic resin, a non-crosslinked thermoplastic resin is preferably used in the point that a state in which the functional additive mentioned below is homogeneously mixed is easily formed.

(Kinds of Functional Additives)

The functional additive to be incorporated in the core layer 2 is/are one or more selected from inorganic powder and inorganic fibers. Specific examples include particulate material and fibers of metals, minerals, metal compounds and other inorganic substances, and examples can include carbons such as carbon black, graphite, graphene, carbon nanotube, carbon nanofibers, carbon microfibers, carbon microcoils and carbon nanocoils, fibers such as glass fibers, metal fibers and carbon fibers, metal carbonates such as calcium carbonate, magnesium carbonate and barium carbonate, metal sulfates such as calcium sulfate, magnesium sulfate and aluminum sulfate, metal oxides such as iron oxide, ferrite, aluminum oxide, zinc oxide, silicon oxide, lead oxide, magnesium oxide, cobalt oxide, titanium oxide and calcium oxide, and other clays or natural minerals such as clay, kaolin and zeolite, and the like. Among these, carbons and metal oxides are preferable as the functional additives, and specifically, carbons can be preferably used in that they are excellent in homogeneous dispersibility in the resin, and the like. As the carbons, conductive carbons are preferably used, and it is more preferable to use a conductive carbon having a DBP absorption amount of 150 to 700 $cm^3/100$ g.

Furthermore, a finer particle size is more preferable for the above-mentioned functional additives in view of dispersibility in the resin, and the particle size is preferably 0.001 to 500 μm, and more preferably 0.01 to 100 μm.

(Content of Functional Additive)

From the viewpoint that higher functions are imparted to the foamed particles, the lower limit of the content of the functional additive in the core layer 2 is 5% by mass, preferably 8% by mass, and more preferably 10% by mass in the thermoplastic resin that constitutes the core layer 2. On the other hand, the upper limit is 90% by mass, and is preferably 70% by mass, more preferably 60% by mass, and further preferably 30% by mass in view of productivity.

In a case where the core layer 2 contains two or more kinds of functional additives, the total amount of these functional additives is deemed as the content of the functional additives in the core layer 2.

(Coating Layer 3)

It is necessary that the coating layer 3 is present in a foamed state. The structure of the coating layer 3 is formed by foaming the thermoplastic resin. In a case where a function was exerted by incorporating a large amount of functional additive in the foamed particles, there was a possibility that the secondary foamability of the foamed particles was lowered, and the fusibility of the resin itself of the foamed particles was lowered. In this case, there was a possibility that the fusion rate, dimension stability and appearance of a foamed particle molding obtained by in-mold molding of the foamed particles containing a large amount of functional additive were lowered. On the other hand, in order to improve the fusibility of the foamed particles, it was necessary to conduct operations such as increasing the molding pressure during the in-mold molding of the foamed particles, and pressurizing the foamed particles in advance. However, if the molding pressure is increased, the shrinkage rate of the molding increases, and thus the dimension stability and appearance of the molding are easily lowered. Furthermore, a problem remained in view of productivity since a pressurization step is required for pressurizing the foamed particles.

On the other hand, in the present invention, each foamed particle is formed of a core layer and a coating layer, and these layers are present at a specific mass ratio. Furthermore, the core layer contains the functional additive, whereas the coating layer 3 contains the functional additive at a smaller content than that in the core layer. Furthermore, the coating layer 3 is in a foamed state. By these facts, the coating layer 3 is sufficiently secondary-foamed during in-mold molding, and the lowering of the fusibility of the resin itself that constitutes the coating layer 3 is suppressed in said foamed particles, and thus the foamed particles can be sufficiently fused each other and a fine foamed particle molding can be formed. Therefore, the foamed particle molding obtained from the foamed particles of the present invention is a foamed particle molding having excellent dimensional accuracy and appearance without lowering of a fusion rate, irrespective of incorporation of the functional additive.

(Thermoplastic Resin)

As the thermoplastic resin for forming the coating layer 3, a similar thermoplastic resin to that constitutes the above-mentioned core layer 2 can be used.

(Presence or Absence of Functional Additive in Coating Layer 3)

The functional additive may be contained or not contained in the coating layer 3, and the content of the functional additive in the coating layer 3 is smaller than that in the core layer 2. From the viewpoint of improving the foamability of the coating layer 3, the content of the functional additive in the coating layer 3 is preferably lower than 20% by mass (including 0), more preferably lower than 10% by mass (including 0), and further preferably lower than 5% by mass (including 0) in the thermoplastic resin that constitutes the coating layer 3. Furthermore, different functional additives may be added to the core layer 2 and the coating layer 3. Furthermore, in a case where the coating layer 3 contains two or more kinds of functional additives, the total amount of these additives is set as the content of the functional additives in the coating layer 3.

(Other Additives and the Like)

The core layer 2 and the coating layer 3 in the thermoplastic resin foamed particles 1 of the present invention can contain other additives as necessary in the scope in which the effect of the present invention is not inhibited. Examples of the other additives include antioxidants, ultraviolet blockers, antistatic agents, metal inactivators, flame retarders, flame retardant aids, dyes, pigments, nucleating agents, lubricants, affinity improvers and the like.

Examples of the above-mentioned antistatic agents include polymeric antistatic agents such as a block copolymer of a polyether and a polyolefin. Furthermore, examples of the above-mentioned flame retarders include brominated organic compounds such as brominated bisphenol-based compounds, brominated polymers such as brominated butadiene-based polymers and brominated polystyrenes, and the like.

(Mass Ratio of Core Layer 2 and Coating Layer 3)

In the thermoplastic resin foamed particles 1 of the present invention, the mass ratio of the core layer 2 to the coating layer 3 is 1:99 to 50:50, preferably 2:98 to 40:60, more preferably 3:97 to 20:80. By setting such mass ratio, the core layer containing the functional additive at a large content is surely coated with the coating layer, the coating layer 3 becomes foamable, and the secondary foamability of the foamed particles is also ensured; therefore, foamed particles having excellent fusibility during in-mold molding while containing the functional additive at an increased content can be obtained. The masses in the above-mentioned mass ratio include the masses of the thermoplastic resin and of the functional additive and the other additive contained in the thermoplastic resin.

Meanwhile, the foamed particles of the present invention can have a structure in which an outermost layer is formed and/or other layer is formed between the core layer and the coating layer besides the core layer 2 and the coating layer 3.

[Functions of Thermoplastic Resin Foamed Particles 1]

In the thermoplastic resin foamed particles 1 of the present invention, the core layer 2 contains functional additive at a specific incorporation ratio as an essential condition. Furthermore, in the thermoplastic resin foamed particles 1, the core layer 2 is a layer in which a larger amount of functional additive is distributed, and the coating layer 3 is a layer that contains the functional additive at a small amount or contains no functional additive. According to the thermoplastic resin foamed particles 1 having such conditions, even when the entirety of the foamed particles contains functional additive in a large amount, the secondary foamability of the thermoplastic resin foamed particles 1 is not inhibited, and thus the fusibility of the foamed particle molding can be maintained. Therefore, a foamed particle molding having a high fusion rate and excellent dimension stability and appearance while containing functional additive in a large amount can be obtained without conducing operations such as increasing of a molding pressure and pressurization of the foamed particles in advance during the in-mold molding of the foamed particles. Furthermore, since the kinds and addition amounts of the functional additive can be adjusted for the thermoplastic resin foamed particle molding obtained by using the thermoplastic resin foamed particles 1, a foamed particle molding to which various functions have been imparted can be obtained.

[Method for Preparing Thermoplastic Resin Foamed Particles 1]

The thermoplastic resin foamed particles 1 can be prepared by, for example, the following method. Specifically, two extruders are prepared, a thermoplastic resin composition for forming a core layer 2 is kneaded in one extruder, and a thermoplastic resin composition for forming a coating layer 3 is kneaded in the other extruder. Subsequently, co-extrusion is conducted from dies each having a predetermined shape, which are attached to the outlet sides of the extruders, to give a sheath-core type string-shaped composite formed of a core layer (R) and a coating layer (R) coating the core layer (R). Secondly, the co-extruded string-shaped composite is cut by means of a cutter equipped with a taking back machine into a predetermined mass or size, whereby columnar composite resin particles each having a non-foamed core layer (R) and a coating layer (R) can be obtained. In addition, the weight of each resin particle is preferably 0.1 to 10 mg.

Examples of the foaming agent can include organic physical foaming agents and inorganic physical foaming agents. Examples of the organic physical foaming agents include aliphatic hydrocarbons, and propane, butane, pentane, hexane, heptane, cyclobutane, cyclopentane, cyclohexane and the like are exemplified. As the inorganic physical foaming agents, air, nitrogen, carbon dioxide, oxygen, argon, water and the like are exemplified.

The foamed particles of the present invention can be obtained by the following method. Firstly, the resin particles each formed of the above-mentioned core layer (R) and the above-mentioned coating layer (R), which are dispersed together with a dispersant in an aqueous medium (generally water) in a pressurizable sealable container (for example, an autoclave), are impregnated with a foaming agent under predetermined pressurization and heating to give foamable resin particles. Thereafter the contents in the container are released together with the aqueous medium into an area at a pressure lower than the pressure in the container under a temperature condition suitable for expansion to allow the foamable resin particles to foam, whereby foamed particles can be obtained.

Furthermore, foamed particles having a higher expansion rate can be obtained by subjecting the obtained foamed particles to a pressurization treatment with a gas such as air to increase the pressure in cells of the foamed particles, and heating them with steam or the like (two-step foaming).

Examples of the above-mentioned dispersant include water-insoluble inorganic substances such as aluminum oxide, calcium triphosphate, magnesium pyrophosphate, zinc oxide, kaolin and mica, and water-soluble polymeric protective colloidal agents such as polyvinyl pyrrolidone, polyvinyl alcohol and methylcellulose. Furthermore, anionic surfactants such as sodium dodecylbenzene sulfonate and sodium alkane sulfonates, and the like can also be used.

(Bulk Density)

The bulk density of the above-mentioned foamed particles is preferably 0.3 g/cm$^3$ or less in view of light weight. Even when the above-mentioned foamed particles have a bulk density of 0.3 g/cm$^3$ or less, excellent secondary foamability can be obtained, and the foamed particles also have excellent in-mold moldability. The above-mentioned bulk density is more preferably 0.01 to 0.25 g/cm$^3$, and further preferably 0.02 to 0.2 g/cm$^3$.

(Average Air Bubble Diameter)

The average cell diameter of the coating layer 3 of the foamed particles of the present invention is 40 to 300 μm. In a case where the average cell diameter is lower than 40 μm, it is possible that the physical properties such as compression permanent strain and modulus of impact resilience of the foamed particle molding are lowered. On the other hand, in a case where the average cell diameter goes beyond 300 μm, it is possible that it becomes difficult to obtain a fine foamed particle molding. From the above-mentioned viewpoints, the above-mentioned average cell diameter is preferably 40 to 280 μm, and more preferably 50 to 250 μm.

(Closed Cell Rate)

The above-mentioned foamed particles have a closed cell rate of preferably 70% or more, more preferably 80% or more, and further preferably 90% or more in view of in-mold moldability.

The average cell diameter, the bulk density and the closed cell rate can be obtained by the methods described in Examples mentioned below.

In a case where the foamed particles of present invention are polypropylene-based resin foamed particles, it is preferable that the foamed particles have a secondary crystal, and said secondary crystal has a heat of fusion by a differential thermal analysis of 1 to 30 J/g.

That is, it is preferable that, when 2 to 10 mg of the above-mentioned polypropylene-based resin foamed particles are heated by a heat-flux differential scanning calorimetry at a temperature rising rate of 10° C./min from 23° C. to 220° C., the obtained DSC curve (the DSC curve of the first heating) has an endothermic peak A inherent to the polypropylene-based resin (hereinafter simply referred to as "inherent peak") and more than one endothermic peak B derived from the above-mentioned secondary crystalline at the high temperature side of the said inherent peak (hereinafter simply referred to as "high temperature peak"), and said high temperature peak has a heat of fusion (hereinafter simply referred to as a high temperature peak heat of fusion) of 1 to 30 J/g. By setting said high temperature peak heat of fusion to be within the above-mentioned range, a foamed particle molding having excellent molding fusibility can be obtained.

As the method for obtaining foamed particles having a high temperature peak in the above-mentioned DSC curve includes, in the above-mentioned step for producing foamed particles, firstly retaining a sealable container at an optional temperature (Ta) within a range of a temperature that is 20° C. lower than the melting point (Tm) of the polyolefin-based resin (Tm−20°) C. or more and lower than the melting finishing temperature (T) of the polyolefin-based resin, for a sufficient time, preferably for about 10 to 60 minutes (a first stage retention step). Secondly, the sealable container is adjusted to an optional temperature (Tb) from a temperature that is 15° C. lower than the melting point (Tm) to the melting finishing temperature (T)+10° C. At this time, where necessary, the sealable container may further be retained at said temperature for a sufficient time, preferably about 10 to 60 minutes (a second stage retention step). Subsequently, the foamable resin particles are foamed by releasing the particles from the inside of the sealable container to a low pressure area. By this method, foamed particles having a high temperature peak can be obtained.

(Thermoplastic Resin Foamed Particle Molding)

The thermoplastic resin foamed particle molding according to the present invention is molded by in-mold molding by using the thermoplastic resin foamed particles 1. Furthermore, the thermoplastic resin foamed particle molding may also be molded by using the thermoplastic resin foamed particles 1 of the present invention and known thermoplastic resin foamed particles in combination. The shape of the thermoplastic resin foamed particle molding is not specifically limited, and can be appropriately preset to be a plate shape, a columnar shape, and various steric shapes.

[Method for Molding Thermoplastic Resin Foamed Particle Molding]

The thermoplastic resin foamed particle molding can be prepared by using, for example, an in-mold molding process. Specifically, firstly, a mold designed to have a desired shape is prepared. Secondly, the mold is filled with the above-mentioned thermoplastic resin foamed particles 1, and the inside of the mold is heated by feeding steam into the mold. At this time, the coating layers 3 of the adjacent thermoplastic resin foamed particles 1 are melt-bonded to each other, and the thermoplastic resin foamed particles 1 are secondary-foamed, whereby the gaps among the foamed particles are filled, and the many thermoplastic resin foamed particles 1 filled in the mold are integrated. The mold is then cooled, and the content is taken out of the mold, whereby a thermoplastic resin foamed particle molding can be obtained.

(Apparent Density)

The apparent density of the thermoplastic resin foamed particle molding is not specifically limited, and is preferably 0.015 to 0.45 g/cm$^3$, more preferably 0.02 to 0.3 g/cm$^3$, and further preferably 0.03 to 0.2 g/cm$^3$. The apparent density of the foamed particle molding can be obtained by dividing the mass of the molding by the volume of the molding. The volume of the molding can be obtained from the outside dimension and the like of the molding.

(Fusion Rate)

From the viewpoint of obtaining an thermoplastic resin foamed particle molding having excellent dimension stability and excellent appearance, the fusion rate of the above-mentioned thermoplastic resin foamed particles 1 that constitute the thermoplastic resin foamed particle molding is 60% or more, preferably 70% or more, and more preferably 80% or more.

(Bending Strength)

The bending strength of the above-mentioned foamed particle molding is measured by the method described in JIS K7221-2 (1999). Specifically, the bending strength of the molding is measured by firstly cutting a sample piece having no molding skin surface of 120×25×20 mm out of the foamed particle molding, and subsequently conducting a three-point bending test on the sample piece by using an autograph apparatus manufactured by Shimadzu Corporation under conditions of a distance between supporting points of 100 mm and a test rate of 10 mm/min.

(Shrinkage Rate of Molding)

Since the foamed particle molding obtained by the foamed particles of the present invention has the above-mentioned specific cell structure, the shrinkage rate of the molding is small. It is preferable that the shrinkage rate of the molding is 3% or less. The shrinkage rate of the molding is measured by the method described below.

(50% Compression Strain)

It is preferable that the foamed particle molding obtained by the foamed particles of the present invention has a 50% compression strain of 5 MPa or less. The 50% compression strain of the molding is measured according to JIS K6767 (1999).

EXAMPLES

The present invention will further be explained below in detail by Examples.

Raw material master batches (MB) were prepared by using the following raw materials, and the thermoplastic resin foamed particles of Examples 1 to 8 and Comparative Examples 1 to 4 shown in Tables 3 and 4 were obtained.

(Raw Materials)

Thermoplastic resin: polypropylene-based resin shown in Table 1

Functional additive: functional additive shown in Table 2

[Preparation of Raw Material Master Batches (MB)]

The PP in Table 1 and the functional additive in Table 2 were fed to a biaxial extruder having an inner diameter of 20 mm at the formulation rate shown in Tables 3 and 4, melt-kneaded at 200 to 220° C., and extruded into a strand shape. Said strand was cooled and cut to give a master batch for forming a functional additive-containing core layer and a master batch for forming a coating layer.

[Production of Thermoplastic Resin Particles (Resin Particles)]

Example 1

An extruder including an extruder for a resin particle-core layer having an inner diameter of 65 mm and an extruder for a resin particle-coating layer having an inner diameter of 30 mm in which a die for forming a multilayer strand had been attached to the outlet sides of the extruders was prepared. The above-mentioned master batch for forming a core layer was fed to the extruder for a resin particle-core layer having an inner diameter of 65 mm, and simultaneously, the above-mentioned master batch for forming a coating layer was fed to the extruder for a resin particle-coating layer having an inner diameter of 30 mm so as to give the formulation rate shown in Table 3. The respective master batches were heated at a temperature of 200 to 220° C., melted and kneaded, fed to the above-mentioned die, and combined in the die. Furthermore, the master batches were co-extruded as a multilayer strand including a core layer coated with a coating layer from fine pores of a cap attached to the tip of the extruder. Subsequently, the co-extruded strand was cooled with water, and cut with a pelletizer so as to be 2 mg and have L/D=2.4, whereby the resin particles described in Table 3 each having a columnar shape formed into two layers (a sheath-core structure) were obtained. In addition, zinc borate as a cell adjusting agent was fed to the extruder for a coating layer so as to contain the agent of 1,000 ppm by mass in the coating layer. Furthermore, the mass ratio of core layer:coating layer was 10:90.

[Production of Thermoplastic Resin Foamed Particles (Foamed Particles)]

1 kg of the above-mentioned resin particles were charged together with 3 L of water as a dispersion medium in a 5 L autoclave, and 3 g of kaolin as a dispersant, 0.04 g of a sodium alkylbenzene sulfonate as a dispersion aid, and 0.1 g of aluminum sulfate were each added to the dispersion medium. Carbon dioxide as a foaming agent was injected into a sealable container with applying a pressure so that the pressure in the container becomes the pressure shown in Table 3, and the temperature of the sealable container was raised by heating up to the foaming temperature while the dispersion medium was stirred. The sealable container was retained at a foaming temperature for 15 minutes to adjust the high temperature peak heat of fusion of the resin particles, and the content in the autoclave was released together with water under an atmospheric pressure to give the thermoplastic resin foamed particles described in Table 3.

[Production of Thermoplastic Resin Foamed Particle Molding (Foamed Particle Molding)]

A cavity of a flat plate-molding mold having length 250 mm (longitudinal side)×width 200 mm×thickness 50 mm was filled with the above-mentioned foamed particles, and subjected to in-mold molding by steam heating to give a plate-like foamed molding. At this time, pre-heating (a gas exhausting step) was firstly conducted by feeding steam into the molding mold for 5 seconds in a state that the drain valves of the molding mold on the both surfaces were opened, one-direction heating was then conducted at a pressure of 0.04 MPa (G) lower than molding pressure, one-direction heating from the opposite direction was then conducted at a pressure of 0.02 MPa (G) lower than molding pressure, and heating was then conducted at the molding heating vapor pressure (molding pressure) shown in Table 3, whereby foamed particles were formed by in-mold molding.

The molding pressure is the lowest pressure at which a molding having excellent appearance can be obtained without significant shrinkage of the molding. After the heating had been completed, the pressure in the molding mold was released, the molding mold was cooled with water until the surface pressure by the expansion force of the molding became 0.04 MPa (G), the molding mold was opened, and the molding was taken out of the molding mold. The obtained molding was cured in an oven at 80° C. for 12 hours to give a foamed particle molding. The physical properties of the obtained foamed particle molding were shown in Table 3.

Examples 2 to 8

Resin particles, foamed particles and a foamed particle molding were obtained in similar manners to those of Example 1, except that the conditions were changed to the conditions shown in Tables 3 and 4.

Example 9

Resin particles and foamed particles were obtained in similar manners to those of Example 1, except that the conditions were changed to the conditions shown in Table 4. The obtained foamed particles were subjected to a pressurization treatment with air to increase the pressure in the cells of the foamed particles, and foamed by heating with steam to give two-step foamed particles. The two-step foamed particles were subjected to in-mold molding under similar conditions to those of Example 1 to give a foamed particle molding.

The pressure in the cells applied to the foamed particles was 0.12 MPa, the steam pressure during the second-stage expansion was 0.09 MPa, and the core layer average cell diameter of the foamed particles was 27 μm. Furthermore, the bulk density of the foamed particles after the second-stage expansion was shown in Table 4.

Comparative Example 1

PP1 in Table 1, CB1 in Table 2 and zinc borate were fed to a monoaxial extruder having an inner diameter of 50 mm so that the PP1 becomes 85.9% by mass, the CB1 becomes 14% by mass and the content of the zinc borate becomes 1,000 ppm by mass, melt-kneaded at 200 to 220*C, and extruded into a strand shape. Said strand was cooled, and cut with a pelletizer so as to be 2 mg and have L/D=2.4 to give the single layer resin particles described in Table 3. Resin particles, foamed particles and foamed particle molding were obtained in similar manners to those of Example 1 except for the above-mentioned points.

Comparative Example 2

Resin particles, foamed particles and foamed particle molding were obtained in similar manners to those of Example 1, except that the conditions shown in Table 3 were changed.

Comparative Example 3

PP1 in Table 1, CB1 in Table 2 and zinc borate were fed to a monoaxial extruder having an inner diameter of 50 mm so that the PP1 becomes 85.9% by mass, the CB1 becomes 14% by mass and the content of the zinc borate becomes 1,000 ppm by mass, melt-kneaded at 200 to 220° C., and extruded into a strand shape. Said strand was cooled, and cut with a pelletizer so as to be 2 mg and have L/D=2.4 to give resin particles 1. PP2 in Table 1, CB2 in Table 2 and zinc borate were fed to a monoaxial extruder having an inner diameter of 50 mm so that the PP2 becomes 99.4% by mass, the CB2 becomes 0.5% by mass and the content of the zinc borate becomes 1,000 ppm by mass, melt-kneaded at 200 to 220'C, and extruded into a strand shape. Said strand was cooled, and cut with a pelletizer so as to be 2 mg and have L/D=2.4 to give resin particles 2. The above-mentioned resin particles 1 were foamed under similar conditions to those of Comparative Example 1 to give foamed particles 1 having a bulk density of 0.078 g/cm$^3$. Furthermore, the resin particles 2 were foamed under similar conditions to those of Example 1 to give foamed particles 2 having a bulk density of 0.065 g/cm$^3$. The foamed particles 1 and 2 were mixed in a tumbler so that the weight ratio becomes 15:85, and subjected to in-mold molding under similar conditions to those of Example 1 to give a foamed particle molding.

The obtained foamed particle molding had a fusion rate of 95%, a bending strength of 498 kPa, a density of 0.054 g/cm$^3$ and a shrinkage rate of 2.2%, and a secondary foamability of [Below average], a surface smoothness of [Below average], a molding uniformity of [poor] and a 50% compression strain of 468 kPa.

Comparative Example 4

Preparation of resin particles was tried in similar manners to those of Example 1 except that the conditions shown in Table 4 were changed. However, the content of the functional additive in the core layer was excess, and the extrusion pressure became too high, and thus resin particles were not able to be obtained. Accordingly, preparation of a foamed particle molding was resigned.

TABLE 1

| | Abbreviation | PP1 | PP2 |
|---|---|---|---|
| Polypropylene-based resin | Kind of resin | Ethylene-propylene random copolymer | Ethylene-propylene random copolymer |
| | Ethylene content (%) | 3.6 | 3.1 |
| | Melting point (° C.) | 136 | 131 |
| | Glass transition temperature (° C.) | 3 | 3 |
| | MFR (g/10 min) | 8.2 | 25 |

TABLE 2

| | Abbreviation | CB1 | CB2 | MO1 |
|---|---|---|---|---|
| Functional additive | Kind | Oil furnace black | Oil furnace black | Ferrite |
| | Product name | Ketjen Black EC300J | #650B | |
| | DBP absorption amount (cm$^3$/100 g) | 360 | 114 | — |
| | Particle size (nm) | 40 | 22 | 5 |

TABLE 3

| | | | | Example 1 | Example 2 | Example 3 | Example 4 | Example 5 | Comparative Example 1 | Comparative Example 2 |
|---|---|---|---|---|---|---|---|---|---|---|
| Resin particles | Core layer | PP species | | PP1 | PP1 | PP1 | PP1 | PP1 | PP1 | PP1 |
| | | PP % | | 86.0 | 86.0 | 82.5 | 86.0 | 86.0 | 86.0 | 86.0 |
| | | Functional additive | CB species | CB1 | CB1 | CB1 | CB1 | CB1 | CB1 | CB1 |
| | | | CB % | 14 | 14 | 17.5 | 14 | 14 | 14 | 14 |
| | | Total (% by mass) | | 100 | 100 | 100 | 100 | 100 | 100 | 100 |
| | Coating layer | PP species | | PP1 | PP1 | PP1 | PP1 | PP1 | — | PP1 |
| | | PP % | | 96 | 96 | 96 | 96 | 100 | — | 100 |
| | | Functional additive | CB species | CB2 | CB2 | CB2 | CB2 | — | — | — |
| | | | CB % | 4 | 4 | 4 | 4 | — | — | — |
| | | Total (% by mass) | | 100 | 100 | 100 | 100 | 100 | — | 100 |
| | Core layer/Coating layer (mass ratio) | | | 10/90 | 15/85 | 10/90 | 40/60 | 5/95 | 100/0 | 60/40 |
| | Mass of resin particles (mg) | | | 2 | 2 | 2 | 2 | 2 | 2 | 2 |

TABLE 3-continued

| | | | Example 1 | Example 2 | Example 3 | Example 4 | Example 5 | Comparative Example 1 | Comparative Example 2 |
|---|---|---|---|---|---|---|---|---|---|
| Foamed particles | Production conditions | Retention temperature (° C.) | 148 | 148 | 148 | 148 | 148 | 148 | 148 |
| | | Retention time (min) | 15 | 15 | 15 | 15 | 15 | 15 | 15 |
| | | Pressure in sealable container (MPa (G)) | 2.6 | 2.6 | 2.6 | 2.6 | 2.6 | 3.4 | 2.6 |
| | | Foaming temperature (° C.) | 148 | 148 | 148 | 148 | 148 | 148 | 148 |
| | Physical properties | Apparent density (g/cm$^3$) | 0.071 | 0.075 | 0.063 | 0.074 | 0.064 | 0.080 | 0.071 |
| | | Closed cell rate (%) | 98 | 98 | 98 | 98 | 98 | 92 | 95 |
| | | Average cell diameter of coating layer (μm) | 63 | 68 | 77 | 65 | 63 | — | 67 |
| | | Average cell diameter of core layer (μm) | 19 | 18 | 30 | 24 | 18 | 30 | 34 |
| | | High temperature peak heat of fusion (J/g) | 15.4 | 15.5 | 16.4 | 14.3 | 15.7 | 10.6 | 13.1 |
| Molded body | Physical properties | Molding pressure (MPa (G)) | 0.26 | 0.24 | 0.26 | 0.28 | 0.24 | 0.38 | 0.30 |
| | | Fusion rate (%) | 100 | 100 | 100 | 100 | 100 | 95 | 95 |
| | | Bending strength (kPa) | 513 | 601 | 448 | 548 | 491 | 504 | 529 |
| | | Molding density (g/cm$^3$) | 0.053 | 0.058 | 0.050 | 0.053 | 0.056 | 0.058 | 0.053 |
| | | Shrinkage rate (%) | 2.2 | 2.2 | 2.8 | 2.8 | 2.2 | 3.8 | 3.2 |
| | | Secondary foamability | Good | Good | Good | Good | Good | Poor | Below Average |
| | | Surface smoothness | Excellent | Excellent | Excellent | Good | Excellent | Poor | Below Average |
| | | molding uniformity | Good | Good | Good | Good | Good | Good | Good |
| | | 50% compression strain (kPa) | 430 | 476 | 317 | 397 | 461 | 447 | 388 |

TABLE 4

| | | | | Example 6 | Example 7 | Example 8 | Comparative Example 4 | Example 9 |
|---|---|---|---|---|---|---|---|---|
| Resin particles | Core layer | PP species | | PP2 | PP2 | PP2 | PP1 | PP1 |
| | | PP % | | 10 | 60 | 30 | 5 | 86.0 |
| | | Functional additive | Kind | MO1 | MO1 | MO1 | MO1 | CB1 |
| | | | Formulation amount (% by mass) | 90 | 40 | 70 | 95 | 14 |
| | | Total (% by mass) | | 100 | 100 | 100 | 100 | 100 |
| | Coating layer | PP species | | PP1 | PP1 | PP1 | PP1 | PP1 |
| | | PP % | | 100 | 100 | 100 | 100 | 100 |
| | | Functional additive | Kind | — | — | — | — | — |
| | | | Formulation amount (% by mass) | — | — | — | — | — |
| | | Total (% by mass) | | 100 | 100 | 100 | 100 | 100 |
| | | Core layer/Coating layer (mass ratio) | | 10/90 | 10/90 | 10/90 | 10/90 | 5/95 |
| | | Weight of resin particles (mg) | | 2 | 2 | 2 | — | 2 |
| Foamed particles | Production conditions | Retention temperature (° C.) | | 148 | 148 | 148 | — | 148 |
| | | Retention time (min) | | 15 | 15 | 15 | — | 15 |
| | | Pressure in sealable container (MPa (G)) | | 2.6 | 2.6 | 2.6 | — | 2.6 |
| | | Foaming temperature (° C.) | | 148 | 148 | 148 | — | 148 |
| | Physical properties | Apparent density (g/cm$^3$) | | 0.078 | 0.077 | 0.071 | — | 0.026 |
| | | Closed cell rate (%) | | 96 | 96 | 98 | — | 98 |
| | | Average cell diameter of coating layer (μm) | | 102 | 126 | 118 | — | 92 |
| | | High temperature peak heat of fusion (J/g) | | 14 | 14.2 | 14.8 | — | 15.7 |
| Molding | Physical properties | Molding pressure (MPa (G)) | | 0.18 | 0.22 | 0.20 | — | 0.18 |
| | | Fusion rate (%) | | 100 | 100 | 100 | — | 100 |
| | | Bending strength (kPa) | | 405 | 449 | 459 | — | 191 |
| | | Molding density (g/cm$^3$) | | 0.050 | 0.051 | 0.056 | — | 0.020 |
| | | Shrinkage rate (%) | | 2.4 | 2.4 | 2.4 | — | 3.2 |
| | | Secondary foamability | | Good | Good | Good | — | Good |
| | | Surface smoothness | | Excellent | Excellent | Excellent | — | Excellent |
| | | molding uniformity | | Good | Good | Good | — | Good |
| | | 50% compression strain (kPa) | | 311 | 376 | 328 | — | 198 |

In Tables 3 and 4, the mass ratio of coating layer/core layer represents the ratio (%) of the respective masses of the coating layer and the core layer to the total mass of the resin particles.

The physical properties of the foamed particles and the foamed particle molding were evaluated by the following methods.

[Bulk Density of Foamed Particles]

The bulk density of the foamed particles was obtained as follows. A 1 L measuring cylinder was firstly prepared, and filled with a group of the foamed particles up to the gauge line of 1 L in the measuring cylinder. The mass of the filled foamed particles per 1 L (g/L) was measured, and the unit was converted to obtain the bulk density (g/cm$^3$) of the foamed particles.

[Closed Cell Rate of Foamed Particles]

The closed cell rate of the foamed particles was measured as follows. Using the foamed particles having a bulk volume of about 20 cm$^3$ that had been left in a thermostat chamber for 10 days as a measurement sample, an apparent volume Va was measured as follows according to the submersion method. The measurement sample for which the apparent volume Va was measured was sufficiently dried, and according to the procedure C described in ASTM-D2856-70, the value Vx of the true volume of the measurement sample was measured by "an air-comparison pycnometer 930" manufactured by Beckman-Toshiba, Ltd. Furthermore, based on these volume values Va and Vx, the closed cell rate was calculated according to the following formula, and an average value of five samples (N=5) was deemed as the closed cell rate of the foamed particles.

(Mathematical Formula 7)

$$\text{Closed cell rate (\%)}=(Vx-W/\rho)\times 100/(Va-Q/\rho) \quad (6)$$

In the formula,

Vx: the true volume (cm$^3$) of the foamed particles measured by the above-mentioned method, i.e., the sum of the volume of the resin that constitutes the foamed particles and the total volume of the closed cell parts in the foamed particles Va: the apparent volume (cm$^3$) of the foamed particles measured from the raising of the water level when the foamed particles are submerged in water in a measuring cylinder W: the weight (g) of the measurement sample of the foamed particles ρ: the density (g/cm$^3$) of the resin that constitutes the foamed particles

[Average Cell Diameter of Foamed Particles]

The average cell diameter of the foamed particles was measured as follows. The average cell diameter was obtained as follows based on an enlarged photograph obtained by photographing under a microscope a cross-sectional surface obtained by cutting one foamed particle at the B-B cross-sectional surface in FIG. 1 into approximately halves as in FIG. 3. Firstly, in the cross-sectional enlarged photograph of the foamed particle, a perpendicular bisector I with respect to a line segment having the minimum distance from the upper end surface to the lower end surface of the foamed particle was drawn so that the perpendicular bisector runs on the center of the cross-sectional surface of the foamed particle. Secondly, the length of the line segment I from the left end surface to the right end surface of the foamed particle was measured. Subsequently, the length was set as Lc (μm), the number Nc of the cells intersecting with the straight line I was obtained, and a value obtained by dividing Lc by Nc (Lc/Nc) was deemed as the average cell diameter of the core layer 2 of one foamed particle.

Furthermore, in the cross-sectional enlarged photograph of the foamed particle, a curve running at 100 μm inwardly away from the upper end surface of the foamed particle was drawn from the right end surface to the left end surface. Subsequently, the length Ls (μm) of the curve and the number of the cells intersecting with the curve Ns were obtained, and a value obtained by dividing Ls with Ns (Ls/Ns) was set as an average cell diameter of the coating layer 3 in one foamed particle. These operations were conducted on ten foamed particles, and a value obtained by arithmetically averaging the average cell diameters of the core layer 2 and the coating layer 3 of each foamed particle was set as an average cell diameter of the core layer 2 and the coating layer 3 of the foamed particle.

[High Temperature Peak Heat of Fusion of Foamed Particles]

In a DSC curve obtained by heating 1 to 3 mg of the foamed particles by a thermal flux differential scanning calorimeter from 25° C. to 200° C. at a temperature rising rate of 10° C./min (a DSC curve of first heating), an inherent peak Pc having a peak temperature PTmc inherent to the thermoplastic resin appears. Furthermore, more than one endothermic peak Pd having a peak temperature PTmd appears in the high temperature region of said inherent peak. Said endothermic peak Pd is/are the high temperature peak in the present invention, and the surface area of said endothermic peak Pd corresponds to the melting heat of fusion (D) of the high temperature peak of the foamed particles. In addition, the high temperature peak Pd obtained by the retention operation during the above-mentioned production of the foamed particles appears in the DSC curve of the first heating of the foamed particles measured as above, but does not appear in the DSC curve of the second heating obtained when the foamed particles are cooled from 200° C. to 25'C at a cooling rate of 10° C./min after the DSC curve of the first heating is obtained, and heated again at a temperature rising rate of 10° C./min up to 200° C. Therefore, since only a similar endothermic peak to the inherent peak Pc appears in the DSC curve of the second heating, the inherent peak Pc can be easily distinguished from the high temperature peak Pd. The average value of the high temperature peak heat of fusion of five foamed particles (N=5) was deemed as the high temperature peak heat of fusion of the foamed particles.

[Apparent Density of Foamed Particle Molding]

The apparent density of the foamed particle molding was obtained by dividing the mass (g) of the molding by the volume (cm$^3$) obtained from the outside dimension of the molding.

[Fusion Rate of Molding]

The fusion rate of the molding was obtained based on the ratio of the number of the foamed particles that had undergone material failure among the foamed particles exposed on a broken cross-sectional surface when the foamed particle molding was broken. Specifically, firstly, test pieces were cut out of the foamed particle molding, a cut of about 5 mm was made by a cutter knife in each test piece, and the test piece was broken from the cut part. Secondly, the number (n) of the foamed particles present on the broken cross-sectional surface of the foamed particle molding and the number (b) of the foamed particles that had undergone material failure were measured, and the ratio of (b) to (n) (b/n) was represented by a percentage and deemed as a fusion rate (%).

[Shrinkage Rate]

The shrinkage rate [%] of the foamed particle molding was obtained by ((250 [mm]−the longer side length of the molding [mm])/250 [mm])×100. The "250 [mm]" is the size of the longer side of the molding mold. Furthermore, "the longer side length of the molding [mm]" is a value obtained by curing the foamed particle molding obtained in each of Examples and Comparative Examples under an atmosphere of 80° C. for 12 hours, annealing, and further curing under an atmosphere of 23° C. for 6 hours, and thereafter calculating the length of the longer side of the foamed particle molding.

[Surface Smoothness]

The surface smoothness of the foamed particle molding was evaluated by an observation of the surface of the molding by the unaided eyes.

Excellent: represents a fine surface state in which no wrinkles, shrinks, and unevenness due to depression are observed on the surface of the foamed particle molding.

Good: Slight wrinkles, shrinks, and unevenness due to depression are observed on the surface of the foamed particle molding.

Below average: Clear wrinkles, shrinks, and unevenness due to depression are observed on the surface of the foamed particle molding.

Poor: Wrinkles, shrinks, and unevenness due to depression on the surface of the foamed particle molding are significant.

[Secondary Foamability]

The secondary foamability of the foamed particle molding was evaluated as follows.

Good: The gaps among the foamed particles on the surface of the molding are completely filled.

Below average: The gaps among the foamed particles on the surface of the molding are slightly observed.

Poor: The gaps among the foamed particles on the surface of the molding are clearly unfilled.

[50% Compression Strain]

The mechanical strength of the molding was evaluated by measuring the 50% compression strain of the foamed particle molding. Firstly, a test piece was cut out of the central part of the molding into length 50 mm×width 50 mm×thickness 25 mm so that the portions except for the skin layer during the molding has a cubic shape. Secondly, using an AUTOGRAPH AGS-X (manufactured by Shimadzu Corporation) on this test piece, the load at 50% strain was obtained at a compression rate of 10 mm/min according to JIS K 6767 (1999). The 50% compression strain [kPa] was obtained by dividing this load by the pressurized surface area of the test piece.

[Electrostatic Capacity]

The electrostatic capacity of the foamed particles was measured by using a electrostatic capacity meter CM113N manufactured by Yamamoto Electric Instruments. A probe having a detection electrode diameter of 98 mm, a guard electrode outer diameter of 150 mm, an inner diameter of 100 mm, an electrode width of 50 mm, and an insulation distance between electrodes of 2 mm (A1407-8065) was used. Specifically, firstly, a metal plate to be a counter electrode was put on the horizontal surface, and a cylinder made of an insulator of inner diameter 100 mm×outer diameter 150 mm×height 100 mm was put thereon so that the circular part becomes a bottom surface. Secondly, a measurement probe was installed on the cylinder so that any gap is not generated between the guard electrode and the cylinder, and the origin point was adjusted by measuring the electrostatic capacity. The cylinder on the counter electrode was then filled to full leveling with the foamed particles that had been cured under conditions of 23'C and 50% RH for 1 day so that the gaps are minimized, a measurement probe was then put on the cylinder filled with the foamed particles, and the electrostatic capacity of the foamed particles was measured. The measured electrostatic capacity was 0.326 pF in Example 1, and 0.369 pF in Example 2.

[Molding Uniformity]

Good: The foamed particle molding is evenly constituted since it is constituted by a single kind of foamed particles.

Poor: The foamed particle molding is unevenly constituted since it is constituted by two kinds of foamed particles.

[Results of Evaluation]

In the foamed bodies of Examples 1 to 9, the core layers of the foamed particles were highly filled with the functional additives. Furthermore, since the coating layers of the foamed particles were foamed, and the coating layers did not contain the functional additives in a large amount with respect to the core layers, the foamed particles were excellent in the secondary foamability during the in-mold molding. Therefore, it was confirmed that a molding being excellent in fusibility and dimension stability while containing functional additives in a large amount, and also being excellent in appearance, in which the gaps of the foamed particles are filled, and no wrinkles, shrinks and depressions are seen on the surface, was able to be obtained. Accordingly, it can be said that a foamed particle molding having a low shrinkage rate and being excellent in dimension stability can be obtained while utilizing the properties of various functional additives, by using the foamed particles of the present invention in which the functional additives are incorporated.

On the other hand, Comparative Example 1 is an example of a foamed particle molding having a single layer, in which the core layers of the foamed particles are highly filled with the functional additives. Therefore, problems remained in the secondary foamability of the foamed particles and the appearance of the molding, the shrinkage rate of the molding was high, and the molding was poor in dimension stability.

In Comparative Example 2, since the mass ratio of the core layers, which were highly filled with the functional additives, in the foamed particles was high, the foamed particles were poor in secondary foamability, the shrinkage rate of the molding was high, and the molding was poor in dimension stability and appearance.

In Comparative Example 3, the foamed particle molding was formed from the foamed particles formed by mixing the foamed particles 1 and 2 having different functional additive contents. The foamed particles 1, which have a large functional additive content and a dark color, are different in appearance from the foamed particles 2, which have a light color, and thus these foamed particles can be identified. In Comparative Example 3, it was confirmed by a visual observation that the foamed particles 1 were interspersed in the molding, and the molding was heterogeneously constituted. Furthermore, differences were seen in the degrees of dispersion of the foamed particles 1 in the moldings among the plural foamed particle molding prepared by the production method of Comparative Example 3. Moreover, since the difference in molding shrinkage rate and the difference in secondary foamability were significant between the part formed of the foamed particles containing carbon black at a large amount and the part formed of the foamed particles containing carbon black at a small amount in the molding, the obtained molding was poor in secondary foamability and surface smoothness.

Furthermore, since the concentration of the filler material added to the core layers was very high in Comparative Example 4, resin particles were not able to be made, and thus a foamed body was not able to be obtained.

The invention claimed is:

1. Thermoplastic resin foamed particles comprising [more than] one *or more* functional additive selected from inorganic powder and inorganic fibers, wherein each particle comprises a core layer formed of a thermoplastic resin and a coating layer in a foamed state formed of a thermoplastic resin, the mass ratio of the coating layer to the core layer is 99:1 to 50:50, the content (X) of the functional additive in the core layer is 5 to 90% by mass, and the content of the functional additive in the coating layer is smaller than the content (X) of the functional additive in the core layer.

2. The thermoplastic resin foamed particles according to claim 1, wherein the content of the functional additive in the coating layer is lower than 20% by mass (including 0).

3. The thermoplastic resin foamed particles according to claim 1, wherein the functional additive is [an] *a* conductive carbon.

4. The thermoplastic resin foamed particles according to claim 1, wherein the thermoplastic resin that forms the core layer and the thermoplastic resin that forms the coating layer are both polyolefin-based resins.

5. The thermoplastic resin foamed particles according to claim 2, wherein the functional additive is [an] *a* conductive carbon.

6. The thermoplastic resin foamed particles according to claim 2, wherein the thermoplastic resin that forms the core layer and the thermoplastic resin that forms the coating layer are both polyolefin-based resins.

* * * * *